United States Patent
Bossen et al.

[11] Patent Number: 6,058,491
[45] Date of Patent: May 2, 2000

[54] METHOD AND SYSTEM FOR FAULT-HANDLING TO IMPROVE RELIABILITY OF A DATA-PROCESSING SYSTEM

[75] Inventors: Douglas Craig Bossen; Arun Chandra, both of Austin, Tex.

[73] Assignee: International Business Machines Corporation, Armonk, N.Y.

[21] Appl. No.: 08/929,014

[22] Filed: Sep. 15, 1997

[51] Int. Cl.[7] .................................................. G06F 13/00
[52] U.S. Cl. .................................. 714/15; 714/13; 714/11
[58] Field of Search ................................. 714/13, 15, 17, 714/11, 12, 10

[56] References Cited

U.S. PATENT DOCUMENTS

| | | | |
|---|---|---|---|
| 4,099,241 | 7/1978 | Ossfeldt | 364/200 |
| 4,438,494 | 3/1984 | Budde et al. | 364/200 |
| 4,696,003 | 9/1987 | Kerr et al. | 371/19 |
| 5,204,952 | 4/1993 | Ayers et al. | 395/550 |
| 5,233,611 | 8/1993 | Triantafyllos et al. | 371/16.1 |
| 5,243,607 | 9/1993 | Masson et al. | 371/69.1 |
| 5,269,017 | 12/1993 | Hayden et al. | 395/575 |
| 5,689,689 | 11/1997 | Meyers et al. | 395/553 |
| 5,751,955 | 5/1998 | Sonnier et al. | 395/200.19 |
| 5,838,894 | 11/1998 | Horst | 395/182.09 |
| 5,845,060 | 12/1998 | Vrba et al. | 395/182.1 |
| 5,872,907 | 2/1999 | Griess et al. | 395/182.15 |

*Primary Examiner*—Norman Michael Wright
*Attorney, Agent, or Firm*—Volel Emile; Antony P. Ng; Andrew J. Dillon

[57] ABSTRACT

A method and system for handling detected faults in a processor to improve reliability of a computer system is disclosed. A fault-tolerant computer system is provided which includes a first processor, a second processor, and a comparator. Coupled to a system bus, a first processor is utilized to produce a first output. The second processor, also coupled to the system bus, is utilized to produce a second output. During the operation of the computer system, the second processor operates at the same clock speed as the first processor and lags behind the first processor. The comparator is utilized to compare the first and second output such that an operation will be retried if the first output is not the same as the second output.

24 Claims, 6 Drawing Sheets

| Time | Program Code 1 | Program Code 2 |
|------|----------------|----------------|
| 1 | Read(A) | NOP |
| 2 | Transform(T,A) | Read(A) |
| 3 | Write(A) | Transform(T,A) |
| 4 | Read(B)** | Write(A) |
| 5 | Transform(S,B) | Read(B) |
| 6 | Read(B) | Transform(S,B) |
| 7 | Transform(S,B) | Write(B) |
| 8 | Write(B) | Read(C) |
| 9 | Read(C) | Transform(U,C) |
| 10 | Transform(U,C) | Write(C) |
| 11 | Write(C) | |

** Error Occurs

Fig. 6

METHOD AND SYSTEM FOR FAULT-HANDLING TO IMPROVE RELIABILITY OF A DATA-PROCESSING SYSTEM

BACKGROUND OF THE INVENTION

1. Technical Field

The present invention relates to a method and system for fault detection in general, and in particular to a method and system for detecting faults in a processor. Still more particularly, the present invention relates to a method and system for handling detected faults in a processor to improve reliability of a data-processing system.

2. Description of the Prior Art

As personal computers and workstations are utilized to perform more and more substantial applications that were formerly reserved for mainframes, system availability and data integrity become increasingly important for these "smaller" computers. However, expensive fault-tolerant techniques and elaborate internal-checking hardware are seldom available in these "smaller" computers because of cost.

In the prior art, a technique known as lock-step duplexing is utilized to assure data integrity in lower priced computers. With lock-step duplexing, two processing elements are utilized for fault detection; when a mismatch is found between the two processing elements, the computer system immediately comes to a halt. In certain aspects, this is a very safe methodology as it assumes that all occurred errors are permanent. But at the same time, the associated cost of this methodology can also be very high because there is usually a long downtime for each outage. This is particularly true when the majority of errors that occurred in the field are transient in nature, making such methodology seemingly over-conservative.

As an improvement, some lock-step duplexing systems are enhanced by utilizing a "retry." More specifically, if there is a mismatch, both processing elements are retried and the result comparison is performed again. The computer system will be halted when there is a second mismatch. Accordingly, the technique of lock-step duplexing with retry can be utilized in fault detection and recovery for transient errors also. Due to the high occurrence rate of transient errors, lock-step duplexing systems with retry tend to have higher system availability than lock-step duplexing systems without retry. Still, there is a concern about data integrity exposures in all systems that are based on lock-step duplexing technique. Such concern stems from common-mode errors.

Common-mode errors (either permanent or transient), which may occur in any peripheral component of the computer system, such as memory, bus, etc., can potentially feed both lock-stepped processing elements with the same bad data and cause a data integrity violation without being detected. Consequently, it would be desirable to provide an improved and yet reasonably economical method for the detection, reporting, and recovery of transient errors in a computer system.

SUMMARY OF THE INVENTION

In view of the foregoing, it is therefore an object of the present invention to provide an improved method and system for fault detection.

It is another object of the present invention to provide an improved method and system for detecting faults in a processor.

It is yet another object of the present invention to provide an improved method and system for handling detected faults in a processor to improve reliability of a data-processing system.

In accordance with the method and system of the present invention, a fault-tolerant computer system is provided which includes a first processor, a second processor, and a comparator. Coupled to a system bus, a first processor is utilized to produce a first output. The second processor, also coupled to the system bus, is utilized to produce a second output. During the operation of the computer system, the second processor operates at the same clock speed as the first processor and lags behind the first processor. The comparator is utilized to compare the first and second output such that an operation will be retried if the first output is not the same as the second output.

All objects, features, and advantages of the present invention will become apparent in the following detailed written description.

DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 6 is an example sequence of two transaction processes executing in accordance with a preferred embodiment of the invention.

DESCRIPTION OF A PREFERRED EMBODIMENT

The present invention may be applicable in a data-processing system having any type of processors. For the purpose of illustration, a preferred embodiment of the present invention, as described below, is implemented by utilizing reduced instruction set computing (RISC) processors, such as the PowerPC™ microprocessors, manufactured by International Business Machines Corporation.

Figure 1:
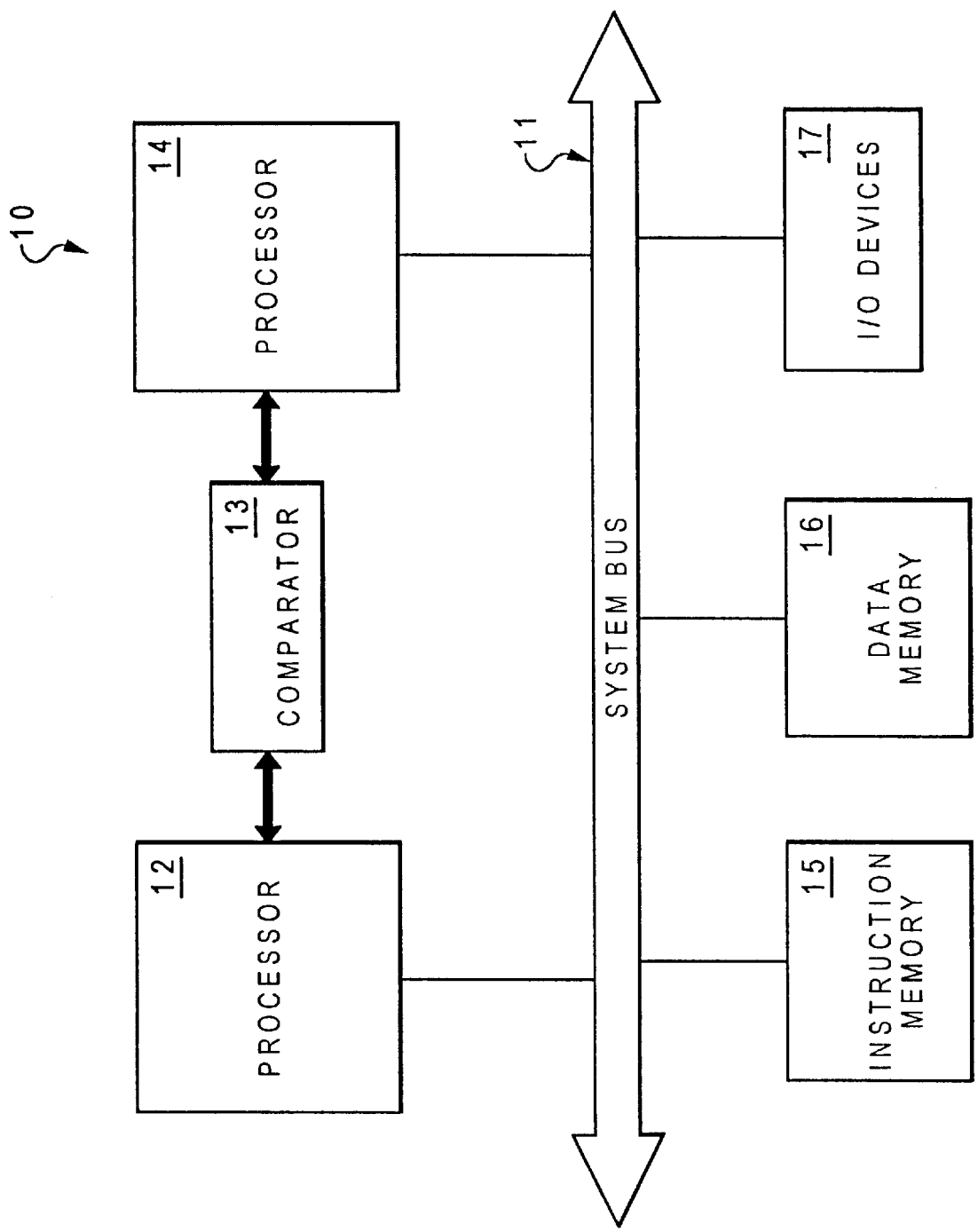
FIG. 1 is a block diagram of a fault-tolerant computer system, in accordance with a preferred embodiment of the present invention.

Referring now to the drawings and in particular to FIG. 1, there is illustrated a block diagram of a fault-tolerant computer system, in accordance with a preferred embodiment of the present invention. As shown, fault-tolerant computer system 10 includes a first processor 12, a second processor 14, both coupled to a comparator 13. Both processor 12 and processor 14 are identical in every aspect and are connected to a system bus 11. Also attaching to system bus 11 are instruction memory 15, data memory 16, and I/O devices 17.

I. Principles of Time-Lag Computing

Figure 2:
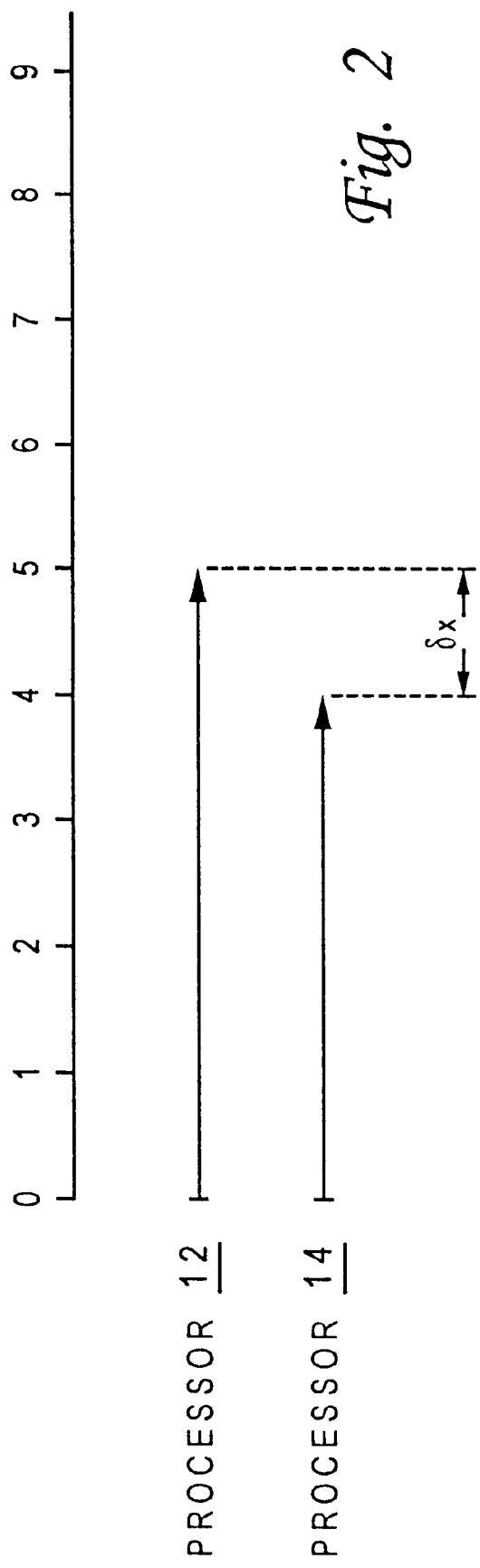
FIG. 2 graphically illustrates a time-lag computing mechanism utilized within the fault-tolerant computer system of FIG. 1, in accordance with a preferred embodiment of the present invention.

Under time-lag computing, there are two processors operating in parallel in a computer system, both processors operating at the same (clock) speed, with one of two processors lagging the other in operation by a predetermined time interval. With reference now to FIG. 2, there is graphically illustrated a time-lag computing mechanism utilized within fault-tolerant computer system 10, in accordance with a preferred embodiment of the present invention. As shown, a second processor, e.g. processor 14, lags behind a first processor, e.g. processor 12, in operation by a fixed time interval of δx.

Time-lag computing mechanism may be applicable at any level of granularity such as clock cycle, machine instruction, or even high-level software instruction. In other words, the fixed time interval of δx can be one (or more) clock cycle, machine instruction, or set of high-level software instructions. The choice of the granularity level depends on the type of implementation.

When the leading processor (processor 12 in this example) reaches a checkpoint during operation, the leading processor leaves its processing results, preferably in a check/wait buffer, for the lagging processor (processor 14 in the same example) to compare. The processing results stored in the check/wait buffer will not be committed for further processing until a match is confirmed with the result at the same operational checkpoint from the lagging processor. Only when there is a match of processing results at the same operational checkpoint from the two processors will further processing be allowed.

A. Transient Error Recovery

When a transient error occurs, two types of error detection and recovery algorithms may be available, namely, optimistic recovery and pessimistic recovery. An optimistic error-recovery algorithm assumes that a near-coincident fault will not occur again and aggressively pursues an error recovery to minimize performance penalties. On the other hand, a pessimistic error-recovery algorithm does not follow the above assumption and therefore incurs a slightly higher performance penalty.

Under an optimistic error-recovery algorithm, if an error is detected based on a mismatch between processing results from a leading processor and a lagging processor, the leading processor is allowed to continue and the lagging processor is reset to its last checkpoint to retry the previous processing step(s) again. If there is a match at the end of the first retry, the preceding checkpoint state of the leading processor is loaded into the lagging processor, and the system is thus brought back to a normal state. This assumes the availability of a checkpoint state update mechanism. However, if there is still a mismatch detected at the end of the first retry, the leading processor will be reset several checkpoints back (e.g., three checkpoints back) and the processing steps are retried again. There is no need to update the checkpoint state in case of a leading processor error. The system is brought back to its normal state, but now the lagging processor becomes the leading processor and vice versa.

Under a pessimistic error-recovery algorithm, if an error is detected based on a mismatch between processing results from a leading processor and a lagging processor, the leading processor is reset to, for example, two checkpoints back and the processing steps are retried again. If there is a match at the end of the first retry, the lagging processor becomes the leading processor while the system is being brought back to a normal state. However, if there is still a mismatch at the end of the first retry, the previously lagging processor (now leading) is reset to a few checkpoints back (e.g., two checkpoints back) and the processing steps are retried again. The previously leading processor (now lagging) finally becomes the leading processor as the system is brought back to a normal state. Notice that a checkpoint state update mechanism is not required under the pessimistic algorithm.

B. Permanent Error Recovery

A permanent error-recovery algorithm is an extension of both optimistic and pessimistic error-recovery algorithms for transient errors. Thus, a permanent error-recovery algorithm follows the same principle of both optimistic and pessimistic error-recovery algorithms as described above. Under a permanent error-recovery algorithm, if there is still a mismatch detected at the end of a second retry, both leading processor and lagging processor will be halted. At this point, a permanent error handling (or diagnostic) routine will subsequently be invoked for diagnostics, reconfiguration, and repair purposes. During this diagnosis, reconfiguration, and repair process, the system will be unavailable if a data integrity exposure is considered as unacceptable. Otherwise, after diagnosis and reconfiguration, the system may be operated under an unprotected degraded state while the failed processor is being repaired.

II. Time-Lag Processor Architecture

Any existing processor core may be utilized to implement the time-lag computing mechanism as described above; however, a superscalar RISC-based processor is more preferable primarily because of its simple unit instruction size, which makes the implementation of a time-lag computing system much easier. The lag interval between processors is preferably one instruction, and duplication is achieved at the processor level. Although any function of a RISC-based processor may be utilized for duplication, time-lag computing technique is probably most beneficial when the processor is duplicated at the memory, bus, or I/O level for providing protection against common-mode transient errors.

Figure 3:
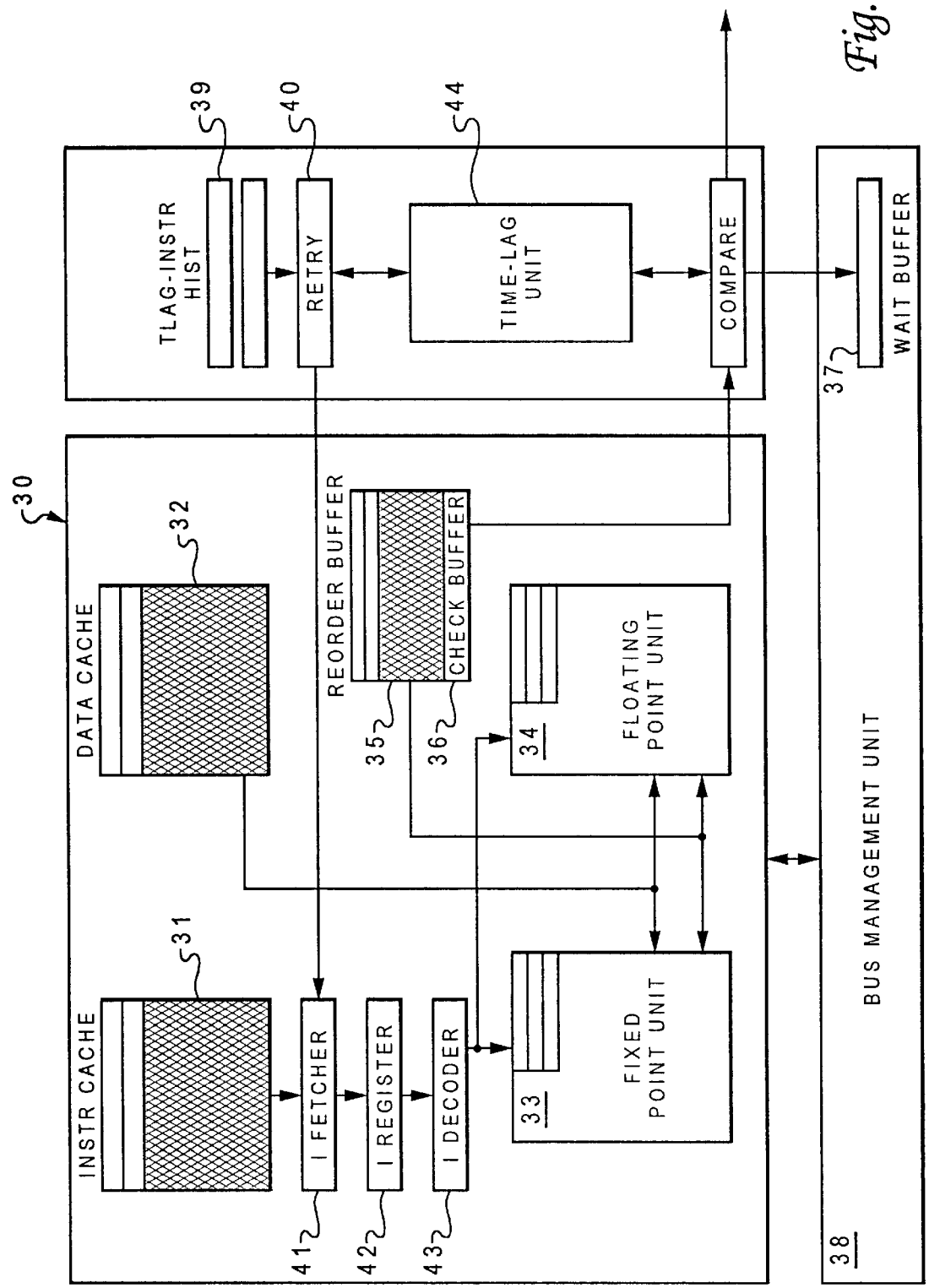
FIG. 3 is a block diagram of a superscalar RISC processor having a time-lag computing mechanism, in accordance with a preferred embodiment of the present invention.

Referring now to FIG. 3, there is illustrated a block diagram of a superscalar RISC processor having a time-embodiment of the present invention. As shown, processor core 30 includes an instruction cache 31, a data cache 32, a fixed-point unit 33, a floating-point unit 34, and a reorder buffer 35. As a preferred embodiment of the present invention, a check/wait buffer, as mentioned previously, is implemented as two separate buffers—a check buffer 36 and a wait buffer 37. Check buffer 36, being part of reorder buffer 35 within processor core 30, is utilized for comparing purposes. Wait buffer 37, incorporated within a bus management unit 38, is utilized to store outgoing bus traffic information. This information contains both outgoing data and their respective addresses. Also mentioned previously, the processing results from processor core 30 stored within wait buffer 37 will not be committed to a storage device until a match with the processing results from another processor is confirmed. The reason being as long as an error is not propagated to a permanent storage device or an I/O device, data integrity of the system will be maintained.

In order to enable time-lag computing, a time-lag instruction history buffer 39 is also required. Instruction history buffer 39 can hold, for example, two instructions. If a mismatch is detected, a retry logic 40 will communicate with instruction fetcher 41 for rollback and retry, while the contents within wait buffer 37 will be discarded. The retry mechanism can redirect the instruction stream to come from instruction history buffer 39. Finally, time-lag unit 44 controls the invocation and function of the error-handling algorithm as described in the previous sections.

Apart from its time-lag computing role, instruction fetcher 41 also provides fixed-point unit 33 and floating-point unit 34 with instructions via an instruction register lag computing mechanism, in accordance with a preferred embodiment of the present invention. As shown, processor core 30 includes an instruction cache 31, a data cache 32, a fixed-point unit 33, a floating-point unit 34, and a reorder buffer 35. As a preferred embodiment of the present invention, a check/wait buffer, as mentioned previously, is implemented as two separate buffers—a check buffer 36 and a wait buffer 37. Check buffer 36, being part of reorder buffer 35 within processor core 30, is utilized for comparing purposes. Wait buffer 37, incorporated within a bus management unit 38, is utilized to store outgoing bus traffic information. This information contains both outgoing data and their respective addresses. Also mentioned previously, the processing results from processor core 30 stored within wait buffer 37 will not be committed to a storage device until a match with the processing results from another processor is confirmed. The reason being as long as an error is not propagated to a permanent storage device or an I/O device, data integrity of the system will be maintained.

In order to enable time-lag computing, a time-lag instruction history buffer 39 is also required. Instruction history buffer 39 can hold, for example, two instructions. If a mismatch is detected, a retry logic 40 will communicate with instruction fetcher 41 for rollback and retry, while the contents within wait buffer 37 will be discarded. The retry mechanism can redirect the instruction stream to come from instruction history buffer 39. Finally, time-lag unit 44 controls the invocation and function of the error-handling algorithm as described in the previous sections.

Apart from its time-lag computing role, instruction fetcher 41 also provides fixed-point unit 33 and floating-point unit 34 with instructions via an instruction register 42 and an instruction decoder 43. Instruction fetcher 41 can retrieve instructions from instruction cache 31 or from the instruction memory (such as instruction memory 15 of FIG. 1) via bus management unit 38. Instruction fetcher 41 is also coupled to retry logic 40 for instruction retry purposes. Fixed- and floating-point units 33, 34 can retrieve data from data cache 32 or the data memory (such as data memory 16 of FIG. 1) via bus management unit 38. In addition, fixed-point unit 33 is also responsible for handling branch instructions.

III. Error Handling Algorithm

An error handling algorithm is an implementation of the pessimistic error-recovery mechanism for a time-lag computing system. As a preferred embodiment of the present invention, one of the two processors within the system is either lagging or leading and stores its internal state information at the end of each checkpoint. The storing of this internal state information at the end of each checkpoint is essential for the implementation of the error handling algorithm.

It is well-known that a superscalar RISC processor achieves a high instruction throughput via speculative execution which allows instructions to be completed out-of-order. However, the processor must also be able to produce correct results when an exception or a mispredicted branch occurs. Hence, most if not all superscalar RISC processors are al already equipped with an efficient recovery and restart mechanism for the storage and retrieval of any in-order state information for anticipating the occurrence of an exception or a mispredicted branch. Now this recovery and restart mechanism can also be utilized by the error handling algorithm. It is even better if the built-in recovery and restart mechanism of a superscalar RISC processor utilizes a reorder buffer, similar to reorder buffer 35 as shown in FIG. 3.

Figure 4:
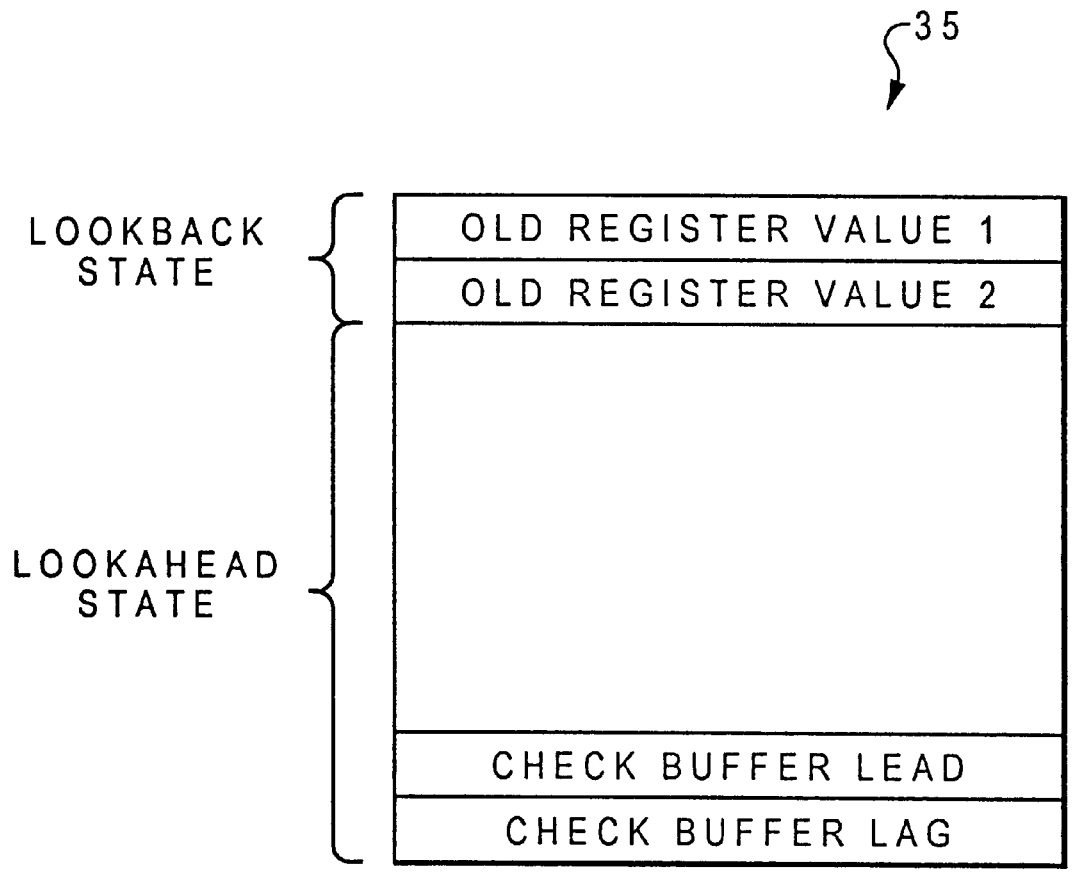
FIG. 4 is a detailed block diagram of a reorder buffer of a time-lag computing mechanism, in accordance with a preferred embodiment of the present invention.

With reference now to FIG. 4, there is depicted a detailed block diagram of reorder buffer 35 in FIG. 3, in accordance with a preferred embodiment of the present invention. As shown, reorder buffer 35 includes both a lookahead state and a lookback state. The lookback state includes old values from modified registers. Any register values that are older than two instructions-old will be discarded, thus the lookback state needs only two entries. The most recent two entries in the lookahead state are two check buffers, namely, check buffer lead and check buffer lag, both utilized for comparison purposes. These two check buffers contain the most updated information of the recent two registers. The lagging processor utilizes the check buffer lead entry while the leading processor utilizes the check buffer lag entry for comparisons. Additionally, the in-order state is also stored in reorder buffer 35.

The justification for utilizing lookahead information for comparison instead of in-order information for out-of-order completion is that if an error occurs, it is detected earlier and can prevent wasted processing time. Also, it ties in better with most currently available reorder buffer recovery scheme. However, errors that would have been discarded on a mispredicted branch will also be flagged by utilizing lookahead information.

During an exception or a mispredicted branch, for most superscalar processor recovery mechanisms, the architectural state is obtained by combining the in-order and lookahead states, ignoring all but the most recent updates to each register. During an exception or a mispredicted branch, for most reorder buffer schemes, the lookahead part of the reorder buffer is discarded, and the processor is reverted to accessing the in-order state in the register file.

In case an error is detected by a mismatch indicated between the check buffer of the two processors, the lookback state can be combined with the in-order state in the register file to obtain the architectural state two checkpoints back. This operation is key to the hardware implementation of the time-lag computing error-recovery algorithm. Also, when a mismatch is detected, wait buffer 37 does not commit its value until a match is confirmed.

IV. Software Implementation

The time-lag computing techniques as described can also be implemented in software for a single processor. As it will be understood by those who are skilled in the art that both optimistic and pessimistic algorithm mentioned above may be utilized in software implementation, the following is an illustration of the pessimistic time-lag algorithm software implementation. An application includes at least three atomic macro-instructions. These are:

1) Read (Record-Id) Reads a record from a data store.
2) Transform (Transform, Record-Id) Transforms the record according to the transform.
3) Write (Record-Id) Writes the record to the data store.

The time-lag granularity in this software implementation is one macro-instruction such that the leading transaction process leads the lagging transaction process by one macro-instruction. A batch of macro-instructions (stored in program store) are a sequence of Read-Transform-Write requests. A Read-Transform-Write operation on a record comprises one transaction. A set of transactions are loaded from the program store into the local memory of the processor during execution.

A comparison of the results between the two processes takes place after each macro-instruction. A signature buffer can be utilized to store the results at the end of each macro-instruction. The signature buffer has the destination address and data fields. Further, the results from a Write request are not committed until a match is confirmed.

Figure 5:
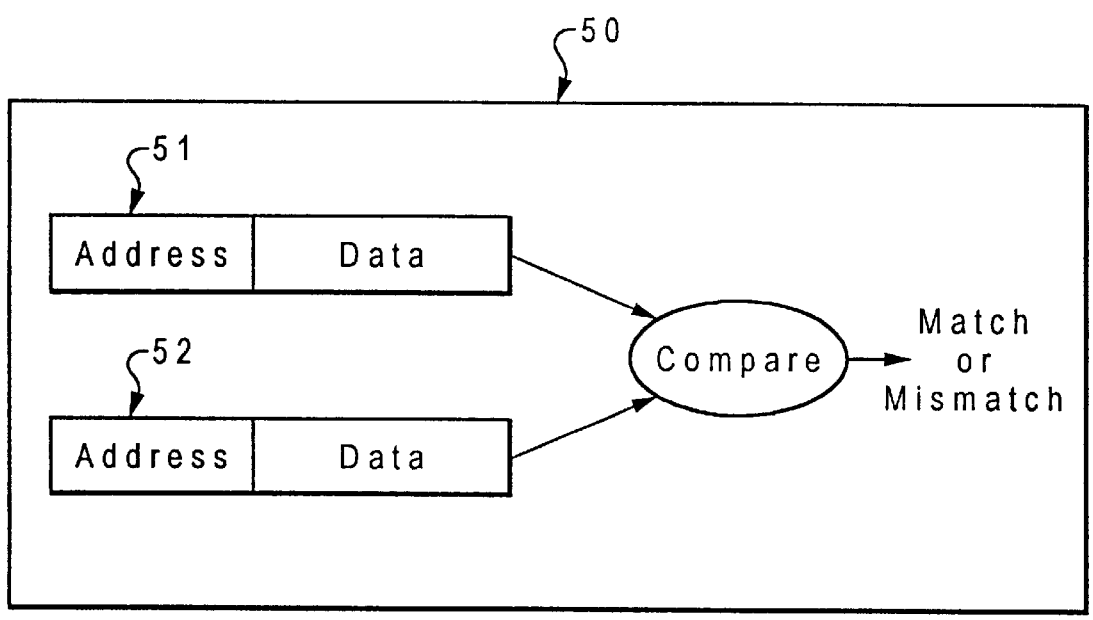
FIG. 5 is a graphical depiction of a write-check buffer associated with an I/O processor, in accordance with a preferred embodiment of the present invention.

Referring now to FIG. 5, there is a graphical depiction of a write-check buffer associated with an I/O processor, in accordance with a preferred embodiment of the present invention. As shown, write-check buffer 50 is a buffer which can associatively compare the contents of its locations, for example location 51 and location 52, to indicate a match or mismatch. Write-check buffer 50 stores the write results from both transaction processes as different times in different locations. A disk or an I/O device will be updated by write-check buffer 50 only when a match is indicated between the two locations, such as locations 51, 52, in write-check buffer 50.

With reference now to FIG. 6, there is shown an example sequence of three transaction processes executing in accordance with a preferred embodiment of the invention. An error occurs (at time point 4) in the leading process and is detected at a checkpoint at time point 5. At this time the I/O processor's write-check buffer has not committed its The leading process is reset to a point 2 checkpoints back and is retried. The lagging process becomes the leading process at the end of recovery. The incorrect result in the write-check buffer is not committed into the data store when the error is detected and is discarded. Subsequently, when a match confirmed the correct result is committed via the write-check buffer. As can be seen a penalty of two time-lag intervals is incurred for a transient fault in the leading process.

As has been described, the present invention provides an improved method for handling detected faults in a processor to improve reliability of a data-processing system. Such improved method of fault tolerance is achieved via a time-lag computing mechanism. A time-lag computing mechanism incorporates both time and hardware redundancy for providing tolerance and error recovery against transient errors in the processor and common-mode transient errors. The time-lag computing mechanism can be applied at any level of granularity. Examples of granularity levels are clock cycle, machine instruction, or high-level software statement.

Furthermore, the fault detection and recovery algorithm utilized by the time-lag computing mechanism is shown for both transient and permanent errors. For transient errors, time-lag computing mechanism provides performance near to that of a Triple Modular Redundancy (TMR) system with duplexed hardware. Time-lag computing mechanism also provides protection against common-mode errors (e.g. glitch on a common bus) which even a TMR system cannot provide because of the time synchronization needed for voting. Time-lag computing mechanism also has a major cost benefit over other types of fault-tolerant systems because it eliminates the need to use internally checked hardware (such as checkers, codes) in the processor and the need to provide protected common-mode components (such as memory, bus, I/O). As a result, off-the-shelf components may be employed to develop fault-tolerant solutions by duplicating only the processing elements (such as microprocessors).

For permanent errors, time-lag computing mechanism only detects errors in the duplicated processors but cannot always detect common-mode permanent errors in the non-duplicated bus, memory, and I/O devices unless store-check buffers are utilized. However, permanent errors are often catastrophic and will lead to other major exceptions which usually cause the computer system to halt anyway. Accordingly, error detection of permanent common-mode errors may be viewed as unnecessary, especially when there is only a very minimal risk of data integrity exposure. Furthermore, the time-lag computing principle as disclosed can also be utilized in a single processor under software implementation.

It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include but not limited to recordable type media such as floppy disks or CD ROMs, and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A fault-tolerant computer system, comprising:

a system bus;

a first processor, coupled to said system bus, for producing a first output;

a second processor, coupled to said system bus, for producing a second output, wherein said second processor operates at a same clock speed as said first processor and lags behind said first processor during operation of said computer system;

a comparator for comparing said first output and said second output such that a first retry operation will be performed beginning from a first checkpoint if said first output is not the same as said second output; and a retry logic block, coupled to said comparator, for resetting said first processor to a second checkpoint preceding said first checkpoint and performs a second retry operation if said first output is still not the same as said second output after said first retry operation, such that said computer system continues to operate with said first processor lagging behind said second processor after said second retry operation.

2. The fault-tolerant computer system according to claim 1, wherein said first processor is identical to said second processor.

3. The fault-tolerant computer system according to claim 1, wherein said fault-tolerant computer system further includes a time-lag unit, coupled to said comparator, for controlling a time-lag between said first processor and said second processor.

4. The fault-tolerant computer system according to claim 3, wherein said fault-tolerant computer system further includes an instruction fetcher coupled to said retry logic block, wherein said retry logic block instructs said instruction fetcher to retrieve previously executed instructions before a retry operation.

5. The fault-tolerant computer system according to claim 4, wherein said fault-tolerant computer system further includes an instruction history buffer, coupled to said retry logic block, for holding instructions that have been executed.

6. The fault-tolerant computer system according to claim 5, wherein said fault-tolerant computer system further includes a wait buffer, coupled to said comparator, for storing said first output until a match is confirmed before sending said first output to a storage device.

7. The fault-tolerant computer system according to claim 1, wherein said second processor lags behind said first processor by at least one clock cycle.

8. The fault-tolerant computer system according to claim 1, wherein said second processor lags behind said first processor by at least one machine instruction.

9. The fault-tolerant computer system according to claim 1, wherein said second processor lags behind said first processor by at least one high-level instruction.

10. A method for handling detected faults in a processor to improve reliability of a data-processing system, said method comprising the steps of:

coupling a first processor to a system bus for producing a first output;

coupling a second processor to said system bus for producing a second output, wherein said second processor operates at a same clock speed as said first processor and lags behind said first processor during operation of said computer system;

comparing said first output and said second output such that a retry operation will be performed if said first output is not the same as said second output; and resetting said first processor to a second checkpoint preceding said first checkpoint and performing a second retry operation if said first output is still not the same as said second output after said first retry operation, such that said computer system continues to operate with said first processor lagging behind said second processor after said second retry operation.

11. The method according to claim 10, wherein said first processor is identical to said second processor.

12. The method according to claim 10, wherein said method further includes an optimistic error-recovery step for allowing a leading processor to continue execution while resetting a lagging processor to a previous checkpoint for said retry operation.

13. The method according to claim 12, wherein said optimistic error-recovery step further resets said leading processor to a plurality of checkpoints back and performs another retry operation when necessary.

14. The method according to claim 10, wherein said method further includes a pessimistic error-recovery step for resetting a leading processor to a plurality of checkpoints back and performing said retry operation.

15. The method according to claim 14, wherein said pessimistic error-recovery step further resets said leading processor to a plurality of checkpoints back and performing another retry operation when necessary.

16. The method according to claim 10, wherein said second processor lags behind said first processor by at least one clock cycle.

17. The method according to claim 10, wherein said second processor lags behind said first processor by at least one machine instruction.

18. The method according to claim 10, wherein said second processor lags behind said first processor by at least one high-level instruction.

19. A fault-tolerant computer program product residing on a computer usable medium, capable of handling detected faults in a data-processing system, said computer program product comprising:

a first program code means within said computer usable medium capable of producing a first output during execution within said data-processing system;

a second program code means within said computer usable medium capable of producing a second output during execution within said data-processing system, wherein said second program code means lags behind said first program code means during execution within said data-processing system;

a program code means within said computer usable medium for comparing said first output and said second output such that a re-execution of either said first program code means or said second program code means will be performed if said first output is not the same as said second output; and a program code means within said computer usable medium for resetting said first processor to a second checkpoint preceding said first checkpoint and performing a second retry operation if said first output is still not the same as said second output after said first retry operation, such that said computer system continues to operate with said first processor lagging behind said second processor after said second retry operation.

20. The fault-tolerant computer program product according to claim 19, wherein said first program code means is identical as said second program code means.

21. The fault-tolerant computer program product according to claim 19, said computer program product further includes an optimistic error-recovery program code means for allowing a leading program code means to continue execution while resetting a lagging program code means to a previous checkpoint for said re-execution.

22. The fault-tolerant computer program product according to claim 21, wherein said re-execution of said second program code means will be first performed if said first output is not the same as said second output.

23. The fault-tolerant computer program product according to claim 19, said computer program product further includes a pessimistic error-recovery program code means for resetting a leading program code means to a plurality of checkpoints back and performing said re-execution.

24. The fault-tolerant computer program product according to claim 21, wherein said re-execution of said first program code means will be first performed if said first output is not the same as said second output.

* * * * *